(12) United States Patent
Sirton

(10) Patent No.: US 8,085,034 B2
(45) Date of Patent: Dec. 27, 2011

(54) MANAGING CHARGING OF ELECTRIC VEHICLES

(75) Inventor: Yaniv Sirton, Savion (IL)

(73) Assignee: Yaniv Sirton, Savion (IL)

( * ) Notice: Subject to any disclaimer, the term of this patent is extended or adjusted under 35 U.S.C. 154(b) by 580 days.

(21) Appl. No.: 12/263,246

(22) Filed: Oct. 31, 2008

(65) Prior Publication Data

US 2010/0114798 A1 May 6, 2010

(51) Int. Cl.
*H02J 7/14* (2006.01)
(52) U.S. Cl. .................. 324/104; 324/109
(58) Field of Classification Search ............ 320/104, 320/109
See application file for complete search history.

(56) References Cited

U.S. PATENT DOCUMENTS

| 6,094,028 A | 7/2000 | Gu |
| 2008/0185991 A1 * | 8/2008 | Harris et al. ............ 320/109 |

* cited by examiner

*Primary Examiner* — Vincent Q Nguyen

(57) ABSTRACT

Managing electrical charging of vehicles with charging devices related to users demand and available power. One system comprises charging points comprising sockets and a communication module, and a mediator server comprising a database, an application and a graphical user interface. The mediator server is connected to the charging points, to the users and to public utilities and electricity providers. Each charging point is arranged to admit vehicles, couple their charging device to the socket and send vehicle data to the mediator server. The mediator server is arranged to process the vehicle data, user data, and data from the public utilities and the electricity providers, and calculate a vehicle priority and a charging allotment in relation to the number of vehicles at the charging point and to the processed data. Vehicles are charged according to the vehicle priority and the charging allotment.

7 Claims, 4 Drawing Sheets

MANAGING CHARGING OF ELECTRIC VEHICLES

FIELD OF THE INVENTION

The present invention generally relates to the field of plug-in electrical vehicles. More particularly, the present invention relates to management of a large scale battery charging process.

BACKGROUND OF THE INVENTION

The auto industry is moving into electric vehicles, which are at least partly driven by electricity supplied by an on-board battery. Electric vehicles operating cost are dramatically lower than the current ICE (internal combustion engine) technologies that use oil (petroleum). In order to allow the industry to switch from fossil fuel to electricity there is a need for additional power plants to supply the additional demand. Vehicle manufacturers are working separately on different technologies for charging and on different connectors.

Plug-In vehicles require electric charging in order to extend their driving range. There is an easy access to electricity in all public places, these power sources can be used to charge electric cars. As these power sources don't belong to the vehicle owner, there will be a benefit of a system that will allow the users to share available power in public places, and for the owners of public places to receive revenue for the access grant.

U.S. Pat. No. 6,094,028, which is incorporated herein by reference in its entirety, discloses a selective-type battery charging and transferring system for electric vehicle that uses a discretionary scheme rather than conventional continuous scheme and selects the fully-charged battery to load on the transfer stage.

BRIEF SUMMARY

The present invention includes a system and method for managing electrical charging of vehicles with charging devices related to users.

One system comprises a plurality of charging points and at least one mediator server. Each charging point comprises at least one socket and a communication module. The at least one mediator server comprises a database, an application and a graphical user interface, and is connected via a first communication link to the plurality of charging points, connected via a second communication link to the users or to a vehicle information module, and further connected to at least one public utility and to at least one electricity provider. Each charging point is arranged to admit vehicles, to couple the vehicle charging device to the socket and to send vehicle data to the at least one mediator server. The at least one mediator server is arranged to process the vehicle data, user data, and data from the at least one public utility and the at least one electricity provider, and to calculate a vehicle priority and a charging allotment in relation to the number of vehicles at the charging point, to the vehicle data, to the user data and to the data from public utilities and electricity providers. Each charging point is arranged to charge the vehicle according to the vehicle priority and the charging allotment.

In embodiments, information exchange between the vehicle and the charging point may be carried out either via a designated communication link or via power line communication.

One method comprises: admitting a vehicle to a charging point, wherein the charging point comprises a socket and is connected via a communication link to a mediator server; coupling the vehicle charging device to the socket; receiving data from the vehicle; sending the vehicle data to the mediator server; processing the vehicle data, user data, and data from public utilities and electricity providers; calculating a vehicle priority and a charging allotment; and charging the vehicle according to the vehicle priority and the charging allotment. The vehicle priority and the charging allotment relate to the number of vehicles at the charging point, to the vehicle data, to the user data and to the data from public utilities and electricity providers.

The present invention further includes a method of managing a vehicle charging network. The method comprises: collecting data from electricity providers; collecting data from public utilities; collecting data from users; enabling users to define charging preferences; and calculating expected electricity demand.

In embodiments, the method further comprising billing the user and crediting public utilities and electricity providers by processing all charging data.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

DETAILED DESCRIPTIONS OF SOME EMBODIMENTS OF THE INVENTION

Figure 1:
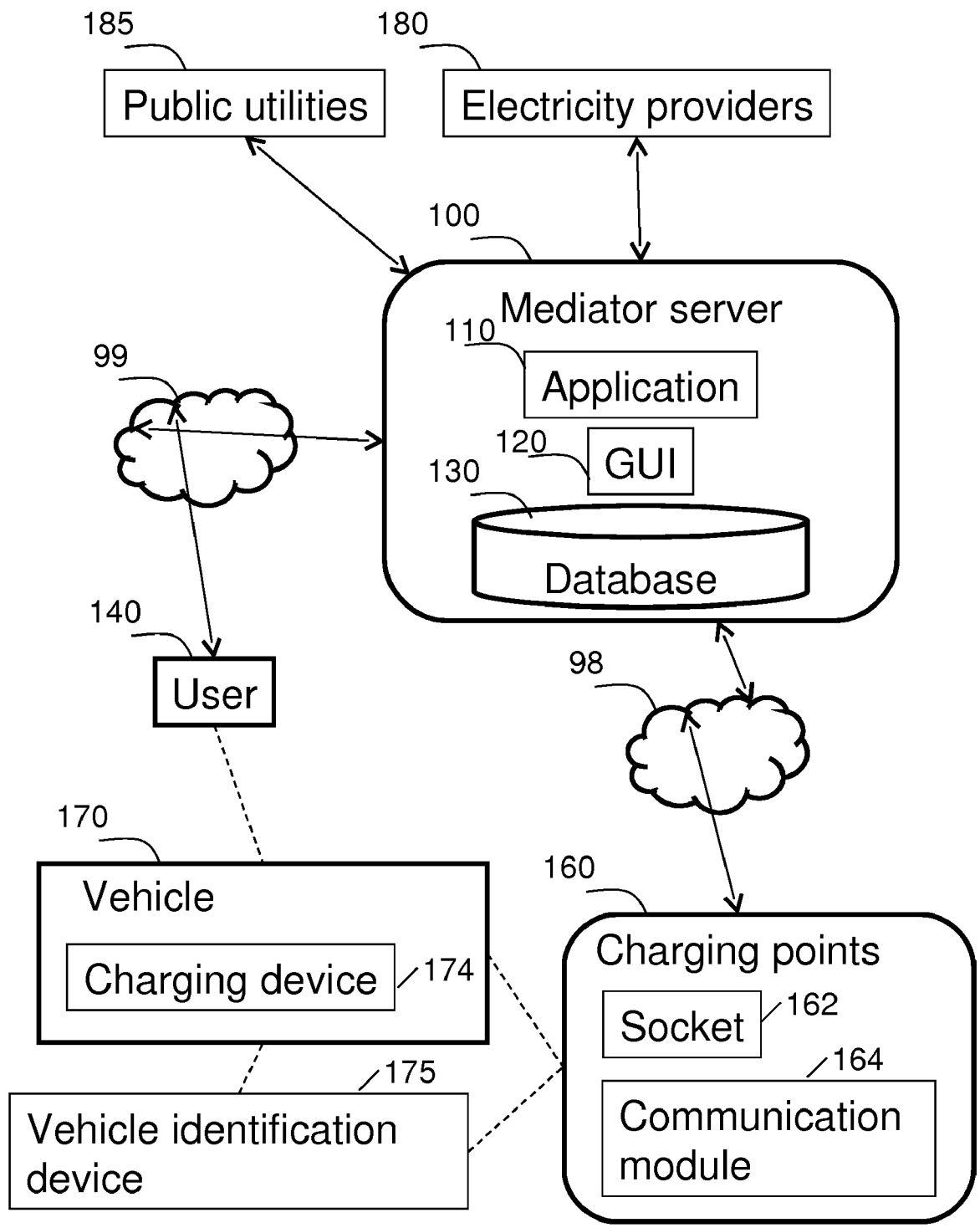
FIG. 1 is a block diagram illustrating a system for managing electrical charging of vehicles, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In other instances, well-known methods, procedures, components and circuits have not been described in detail so as not to obscure the teachings of the present disclosure.

For a better understanding of the invention, the usage of the terms "battery" in the present disclosure is defined in a non limiting manner as an electric energy storing unit.

FIG. 1 is a block diagram illustrating a system for managing electrical charging of vehicles 170, according to some embodiments of the invention. Vehicles 170 are equipped with charging devices 160 and vehicle information modules 175 and are related to users 140. Charging is carried out at charging points 160 equipped with sockets 162 and a communication module 164. The system further comprises at least one mediator server 100 connected via a first communication link 98 to charging points 160. Mediator server 100 comprises a database 130, an application 110 and a graphical user interface 120. Mediator server 100 is connected to public utilities 185 (possible also to private utilities such as user's 140 house network) and to electricity providers 180, e.g. via communication links. Mediator server 100 may be further connected via a second communication link 99 to users 140. Each charging point 160 is arranged to admit vehicles 170, to connect vehicle charging device 174 to socket 162. Socket 162 may comprise an IPDU (Intelligent Power Distribution Unit) socket.

According to some embodiments of the invention, vehicle information module 175 may comprise any vehicle related information, battery related information and information related to the history and behavior of vehicle, battery or driving itself. For example, vehicle information module 175 may comprise data relating to manufacturers, battery charging patterns, vehicle and battery usage patterns, past or planned routes, characteristics of battery discharge. Vehicle information module 175 may comprise or be embodied within an apparatus that is independent of battery manufacturer and may be purchased in addition to an electric vehicle. According to some embodiments, however, vehicle information module 175 may ne purchased as part of an electric vehicle (e.g. fully integrated or as an optional accessory).

Public utilities 185 may comprise one or more charging stations, each with one or more charging points 160. Charging point may comprise one or more sockets 162. The connection between charging point 160 and either vehicle information module 175 or vehicle 170 may be per power line communication (PLC). Socket 162 may be physically associated with public utilities 185 and feed electricity from the electricity grid to vehicle 170.

The exchange between vehicle 170 and charging point 160 comprises both an electric exchange, i.e. charging of the battery via manufacturer cables or by a dedicated system cable (passive), and a data exchange (vehicle and battery data, charging related data) that may be carried out either via manufacturer cable also (as PLC), or by a separate communication link, e.g. radio frequency (RF).

Figure 1A:
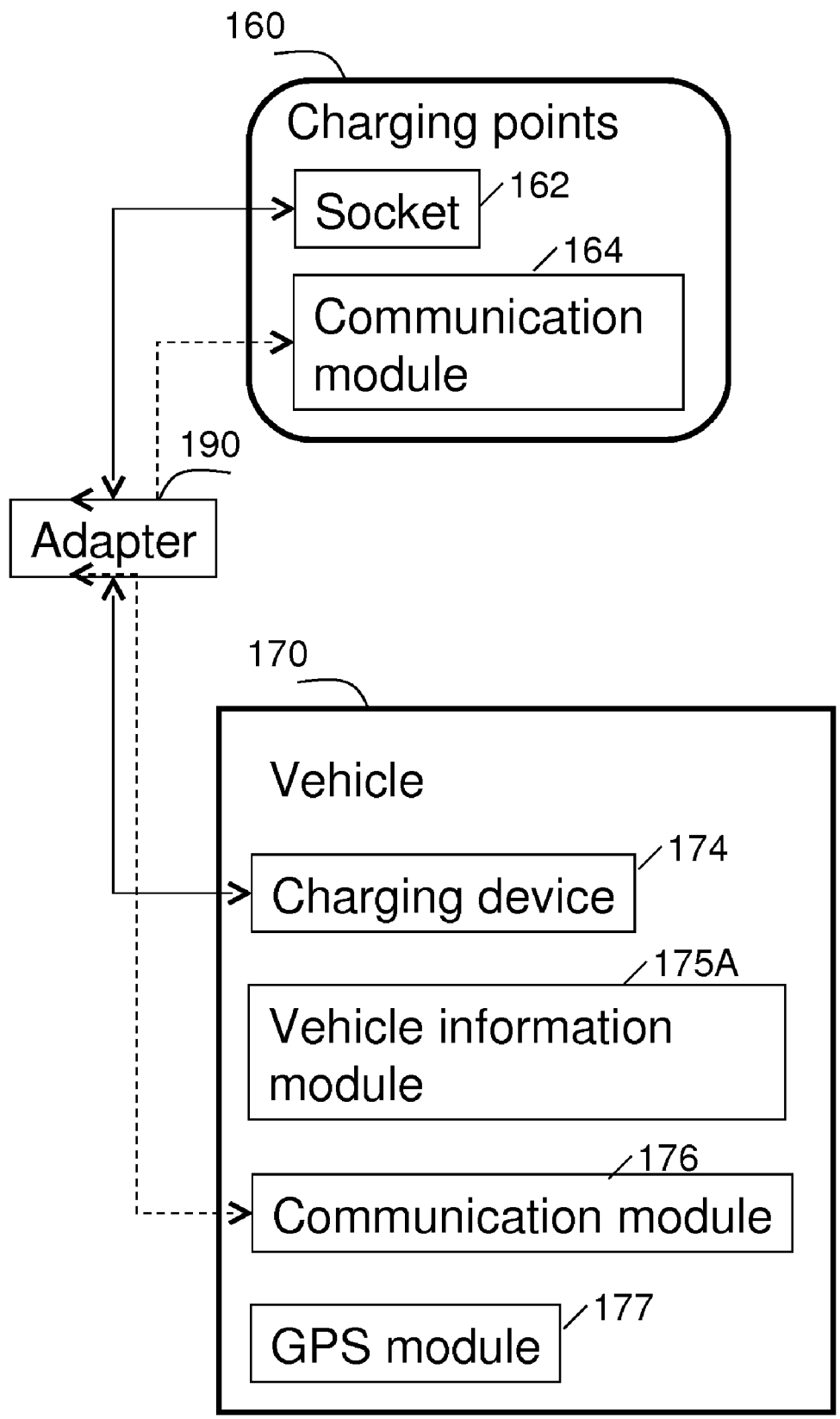
FIG. 1A is a block diagram illustrating in some more detail the connection between vehicle and charging point, according to some embodiments of the invention.

FIG. 1A is a block diagram illustrating in some more detail the connection between vehicle 170 and charging point 160, according to some embodiments of the invention. Vehicle 170 may comprise a vehicle information module 175A may comprise any vehicle related information, battery related information and information related to the history and behavior of vehicle, battery or driving itself. For example, vehicle information module 175A may comprise data relating to manufacturers, battery charging patterns, vehicle and battery usage patterns, past or planned routes, characteristics of battery discharge.

According to some embodiments of the invention, vehicle 170 may further comprise a GPS module 177. GPS module 177 may gather information of the user driving habits and collect vehicle routes and accumulating driving distance. Information from GPS module 177 may be communicated to vehicle information module 175A and further to charging point 160 or to mediator server 100.

According to some embodiments of the invention, vehicle 170 may further comprise charging device 174 connected via an adapter 190 to socket 162 in charging point 160. This connection may facilitate the electric exchange. Vehicle 170 may further comprise a communication module 176 connected via adapter 190 to communication module 164 in charging point 160, or to mediator server 100. This connection may facilitate the data exchange. The data exchange connection may utilize the electric exchange connection (e.g. via PLC) or comprise a separate connection (dashed line).

According to some embodiments of the invention, as vehicle information module 175A and charging device 160 may belong to the vehicle manufacturer, vehicle information module 175A may collect and process vehicle data and send it to socket 162 or to mediator server 100. According to some embodiments of the invention, vehicle 170 is connected to the system via two connections: one to the manufacturer of the charging device by manufacturers cables (or to the manufacturer charging device by a system dedicated cable), the other to the system via communication (e.g. RF—radio frequency between vehicle information module 175A and charging point 160). Each charging point 160 is arranged to send vehicle data (e.g. communicated via vehicle information module 175A) to mediator server 100. Mediator server 100 is arranged to process the vehicle data, user data, and data from public utilities 185 (such as available current for charging) and electricity providers 180. Mediator server 100 is arranged to calculate a vehicle priority and a charging allotment in relation to the number of vehicles at charging point 160 or at a charging station, to the vehicle data, to battery related data, to the user data and to the data from public utilities 185 and electricity providers 180. Finally, charging point 160 is arranged to charge vehicle 170 according to the vehicle priority and the charging allotment.

According to some embodiments of the invention, during the charging of vehicle 170 different information may be communicated to mediator server 100, such as start and end times of charging, amount of electricity charged, failures, different system confirmation. Following the charging, mediator server 100 may complete a billing procedure based on this information and relating to user data and data associated with public utilities 185, electricity providers 180, charging point 160 etc.

According to some embodiments of the invention, the system manages electrical charging of vehicles with charging devices in a 24 hours perspective related to other users sharing the same power source. The system is focused on turning on/off the electricity in the socket, when user 140 connects to charging point 160, socket 162 transfers electricity current only after verification and execution from mediator server 100.

According to some embodiments of the invention, receiving vehicle data may be carried out via vehicle information module 175, e.g. an identification card, and RFID (radio-frequency identification) and a transmitter. Receiving vehicle data may be carried out per wire connected to charging device 174 and a wire connected to socket 162, or via a wireless communication link (e.g. RFID tag to reader) or via PLC (power line communication). Socket 162 or RFID reader may communicate with charging point 160 via a communication link or information may be transmitted to mediator server 100 directly via communication module 164 in charging point 160. Charging point 160 further communicates to mediator server 100 data relating to charging of vehicle 170 such as time and electric current. Authentication of vehicle 170 or user 140 may be carried out by and additional authentication module (not shown, such as an identification card with an RFID transmitter).

According to some embodiments of the invention, charging point 160 may further comprise a current meter for estimating the charging state of the battery, and the electricity that was used to charge the battery in each charging session. Charging points 160 may communicate with each other for network load balancing, either directly via a third communication link (not shown) or via mediator server 100 or via a combination thereof.

According to some embodiments of the invention, mediator server 100 may receive and process at least some of the following parameters: Maximum load of the electric source, power tariff, identification of vehicle 170, identification of user 140, battery type, identification of battery, battery charge meter (absolute and relative to other vehicles), available current, user charging preferences (e.g. relating to charging time and final charge), data related to the method of charging, user driving pattern, user pattern of battery consumption, user request for full charging.

According to some embodiments of the invention, mediator server may be connected to a private utility, such as user's 140 home.

According to some embodiments of the invention, vehicle priority and charging allotment may be calculated in relation to the above parameters for vehicle 170 and other vehicles associated with charging point 160, or with a charging station. These may further relate to the dynamic status of the electric grid (as provided e.g. by public utilities 185), and to available and preferred electricity providers 180 for each user 140 based on user's preferences.

According to some embodiments of the invention, socket 162, vehicle 170, mediator server 100 and electricity providers 180 are fully integrated in function and form a continuum of electricity supply allowing providing electricity at a large number of sockets 162 and vehicles 170 from electricity providers 180 via one or more mediator servers 100.

According to some embodiments of the invention, the system may further comprise a web portal, relating to which users 140 may define preferences relating to electricity providers and energy sources (i.e. renewable sources, coal, wind etc.), to an immediate request for full charging, as well as define preferences relating to consumption pattern of electricity. Further, users 140 may monitor and control their expenses, receive information and dynamically manage their account.

According to some embodiments of the invention, mediator server 100 may further support user usage of electricity in areas other than transportation, e.g. relating to home consumption. The system may operate high demand electric appliances based on tariff and other algorithms remotely.

According to some embodiments of the invention, charging points 160 may be arranged to automatically couple the vehicle charging device to the socket. For example, socket 162 may comprise a passive automated connector from the grid to the vehicle battery to allow the system to operate without the need for an active connection to the grid. For example, charging points 160 may comprise a charging surface that connects to the vehicle once it is parked on a designated parking spot.

According to some embodiments of the invention, the system allows to remotely manage the load on public utilities 185 (the grid) and electricity providers 180. Additionally the system allows users 140 to choose and use alternative energy sources for vehicle electricity. The system concentrates on managing electricity in the network of charging points 160, given that the end points—sockets 162—comply and are adaptable to all industry standards. Sockets 162 are arranged to communicate with all types of adapters and charging devices.

According to some embodiments of the invention, the system allows a billing procedure once a charging session ends. The system may charge user 140 and credit public utility 185 and electricity provider 180 for the electricity and for the use of the infrastructure of public utilities 185.

Figure 2:
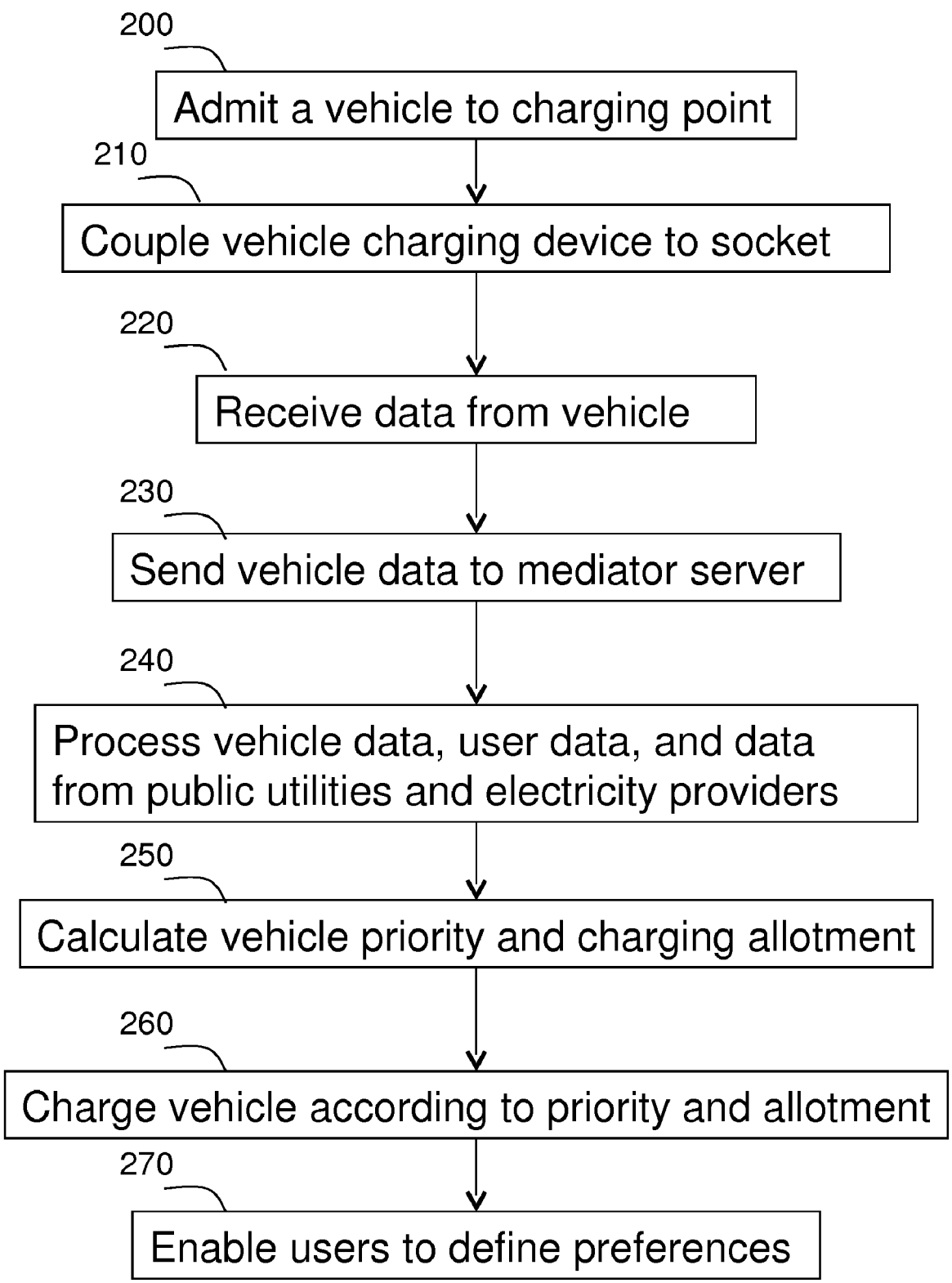
FIG. 2 is a flowchart illustrating a method of managing electrical charging of vehicles, according to some embodiments of the invention.

FIG. 2 is a flowchart illustrating a method of managing electrical charging of vehicles, according to some embodiments of the invention. The vehicles are equipped with charging devices and are related to users. The method comprises the stages: admitting a vehicle to a charging point (stage 200). The charging point comprises a socket and is connected via a communication link to a mediator server; coupling the vehicle charging device to the socket (stage 210); receiving data from the vehicle (stage 220); sending the vehicle data to the mediator server (stage 230); processing the vehicle data (e.g. travelled distance, battery level, battery type etc.), user data, and data from public utilities and electricity providers (stage 240); calculating a vehicle priority and a charging allotment (stage 250). The vehicle priority and the charging allotment relate to the number of vehicles at the charging point, to the vehicle data, to the user data and to the data from public utilities and electricity providers, as well as to data from other sources (e.g. available on the web, or statistical data); and charging the vehicle according to the vehicle priority and the charging allotment (stage 260).

According to some embodiments of the invention, the method may further comprise enabling users to define preferences relating to at least one of: electricity providers, energy sources, consumption pattern of electricity (stage 270).

According to some embodiments of the invention, receiving data from the vehicle (stage 220) is carried out via radiofrequency identification or PLC (power line communication).

According to some embodiments of the invention, the method further comprises performing a billing procedure between the user, the public utility owner and the electricity provider.

According to some embodiments of the invention, coupling the vehicle charging device to the socket (stage 210) may be carried out via a vehicle information module 175 that collects data from vehicle 170. Vehicle information module 175 may be capable of identifying either socket 162, charging device 174 or both, moderate communication between them, enable user to select electricity source via mediator server 100 and communication vehicle and battery data to socket 162 and charging point 160. Vehicle information module 175 may be further comprise GPS module 177.

According to some embodiments of the invention, calculating a vehicle priority and a charging allotment (stage 250) relates to at least some of the parameters: load of the electric source, tariff, identification of vehicle, identification of user, battery type, identification of battery, battery charge meter (absolute and relative to other vehicles), available current, user charging preferences, data related to the method of charging, user driving patterns, user pattern of battery consumption.

According to some embodiments of the invention, coupling the vehicle charging device to the socket (stage 210) may be carried out automatically.

Figure 3:
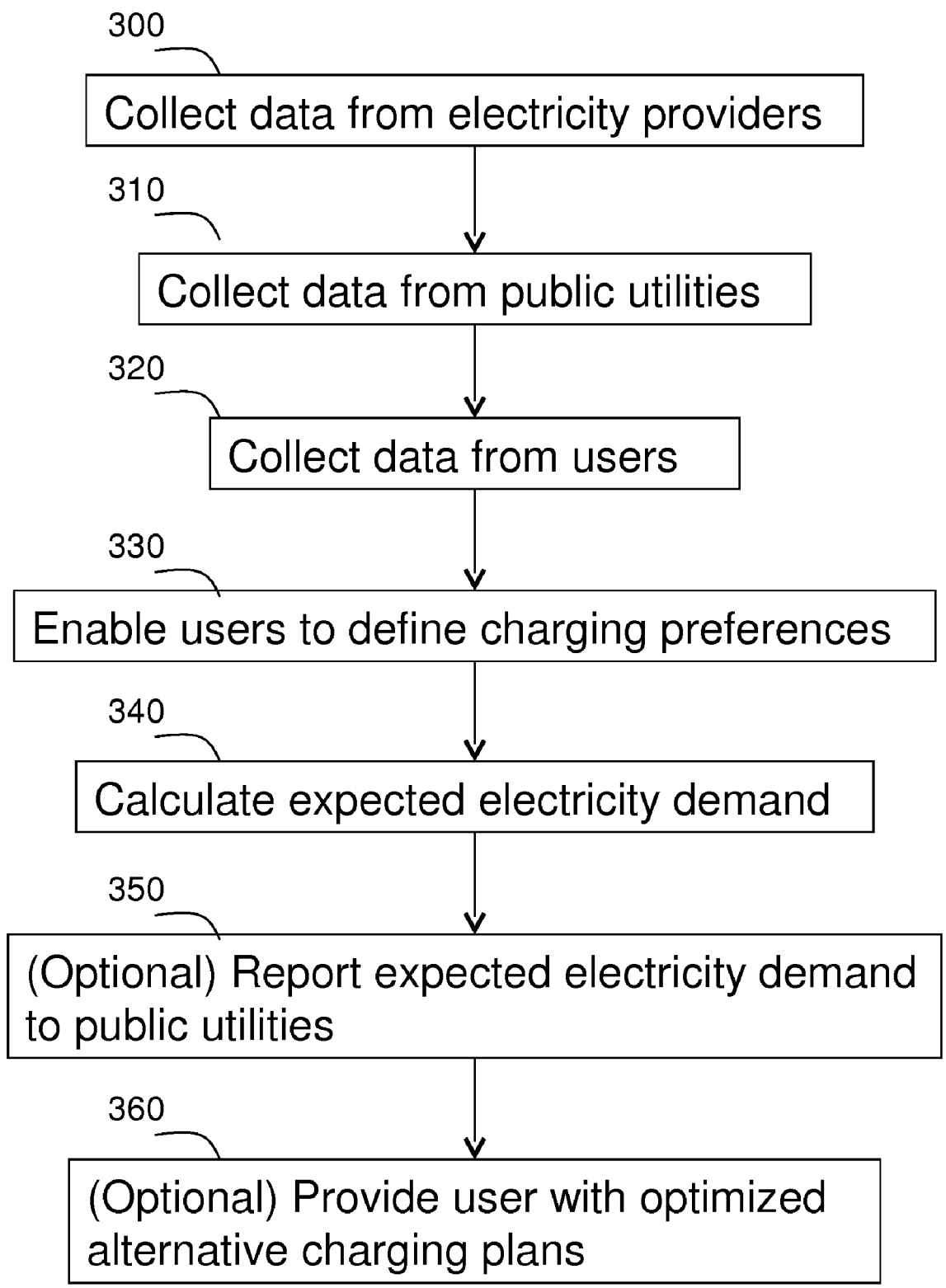
FIG. 3 is a flowchart illustrating a method of managing a vehicle charging network, according to some embodiments of the invention.

FIG. 3 is a flowchart illustrating a method of managing a vehicle charging network, according to some embodiments of the invention. The method comprises the stages:

collecting data from electricity providers (stage 300);
collecting data from public utilities (stage 310);
collecting data from users (stage 320);
enabling users to define charging preferences (stage 330); and
calculating expected electricity demand (stage 340);
reporting expected electricity demand to public utilities (stage 350); and providing user with optimized alternative charging plans (stage 360).

Stages 350 and 360 are optional.

According to some embodiments of the invention, the method may further comprise performing billing transactions between user to public utility and electricity providers According to some embodiments of the invention, charging preferences may comprise a priority (related to payment), type of electricity providers (such as wind, solar, geothermal), usage patterns, trip plans.

According to some embodiments, the invention manages efficient charging of plug-in electric cars (hybrid electric vehicles as well as electric vehicles in general). The system monitors and manages a large scale charging in a 24 hour perspective allowing partial charging, with respect to other users using the same power source (considering its maximum power capability) and with respect to the optimal tariff. The system operates in different charging points, and handles a variety of charging technologies, of batteries and of connector cables. The system allows the user to choose the electric source in use (i.e. coal, wind, photovoltaic) via a personal portal account.

According to some embodiments, the invention is integrated in the transition from vehicles using petroleum-based fuel to electric vehicle. The invention allows a standard solution for all types of batteries produced by different manufacturers. At the same time the invention allows managing charging and electricity demands over the whole grid and users network. The system and method for managing charging also solve the difficulty of the necessity to have numerous charging points to allow increasing the overall range of the electric vehicles, i.e. allowing trips with multiple charging sessions. Over these advantages, the invention further allows integrating source of "clean energy" such as wind, water and solar.

According to some embodiments, the invention provides an automatic passive optimizing charging system for plug-in vehicles, focusing on the vehicle side, the user side, the remotely managed power socket, the available power resources and an execution algorithm.

According to some embodiments, the invention differs from present technology for the following reasons: (i) it manages charging in a large scale taking into account the supply side of the electric grid and not charge per car; (ii) it allows the user to choose the source of power; and (iii) it provides a common solution for different manufacturers. Managing users may be an enhance advantage as high current charging batteries (such as batteries comprising ultra-capacitors) are developed, as these enable a shorter charging time and thus an increased managing load.

According to some embodiments of the invention, further advantages of the current invention are: (i) allowing the transformation from fossil fuel to electricity with a minimum investment in new power sources, and new charging stations; (ii) allowing to monitor all the technologies from different manufacturers as it is focusing in the connection between the grid to the any type of cable connector; (iii) allowing users to demand and fuel their vehicles with clean electricity from any renewable source of their choice; and (iv) enabling utility providers to offer a charging services to users, while being credited for sharing their connection to the grid with users.

According to some embodiments of the invention, the system and method accomplish: Load balancing of existing power source, decreasing cost of electricity for users and, allowing users to choose clean energy source for charging, solving electric failure following a high demand of electricity. The system and method are useful for users of electric vehicles, for the automobile industry and for our global environment. They reduce the cost of operating an electric vehicle via prioritizing charging in low tariff hours, and they create a standard solution to be used with different technologies of different car makers, it will drive a demand for clean energy resources.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A method of managing electrical charging of vehicles with charging devices related to users comprising:
   admitting a vehicle to a charging point, wherein the charging point comprises a socket and is connected via a communication link to a mediator server;
   coupling the vehicle charging device to the socket;
   receiving data from the vehicle;
   sending the vehicle data to the mediator server;
   processing the vehicle data, user data, and data from public utilities and electricity providers;
   calculating a vehicle priority and a charging allotment; and
   charging the vehicle according to the vehicle priority and the charging allotment, wherein the vehicle priority and the charging allotment relate to the number of vehicles at the charging point, to the vehicle data, to the user data and to the data from public utilities and electricity providers.

2. The method of claim 1, wherein said coupling the vehicle charging device to the socket is carried out via a vehicle information module.

3. The method of claim 1, wherein said receiving data from the vehicle is carried out via radio-frequency identification.

4. The method of claim 1, wherein said receiving data from the vehicle is carried out via power line communication.

5. The method of claim 1, wherein said calculating a vehicle priority; and a charging allotment relates to at least some of: a load of the electric source; an identification of vehicle; an identification of user; a battery type; an identification of battery; a battery charge meter (absolute and relative to other vehicles); an available current; user charging preferences; data related to the method of charging; a user driving pattern; and a user pattern of battery consumption.

6. The method of claim 1, further comprising enabling users to define preferences relating to at least one of: electricity providers; energy sources; an electricity consumption pattern.

7. The method of claim 1, wherein said coupling the vehicle charging device to the socket is carried out automatically.

* * * * *